J. C. BACKUS.
AUXILIARY SEAT FOR MOTOR CARS.
APPLICATION FILED MAR. 19, 1915.
1,179,600.
Patented Apr. 18, 1916.
2 SHEETS—SHEET 1.
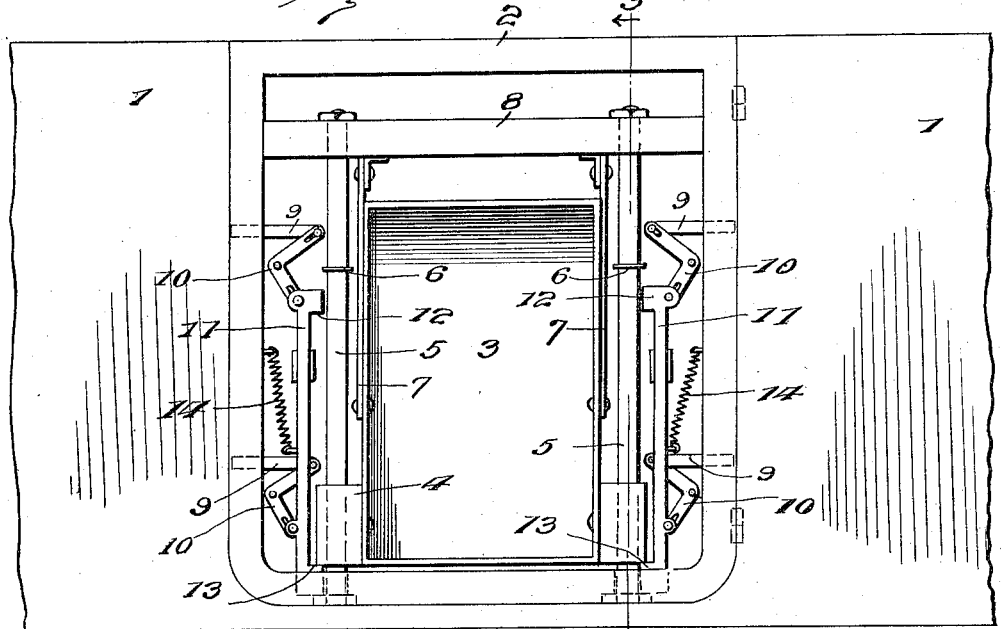
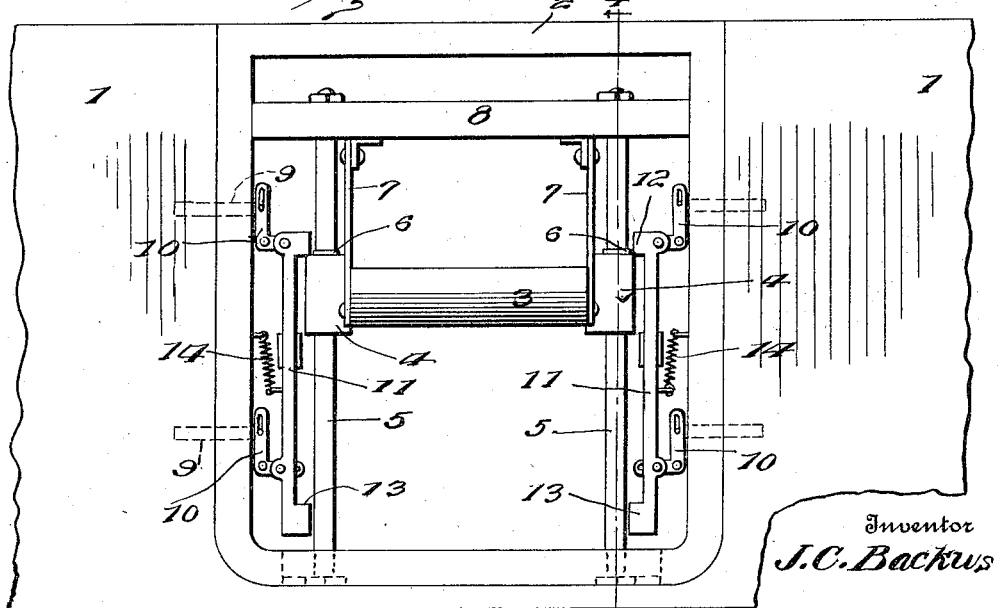
Witnesses
R. F. Beck
U. B. Hillyard.
Inventor
J. C. Backus
By
Attorneys

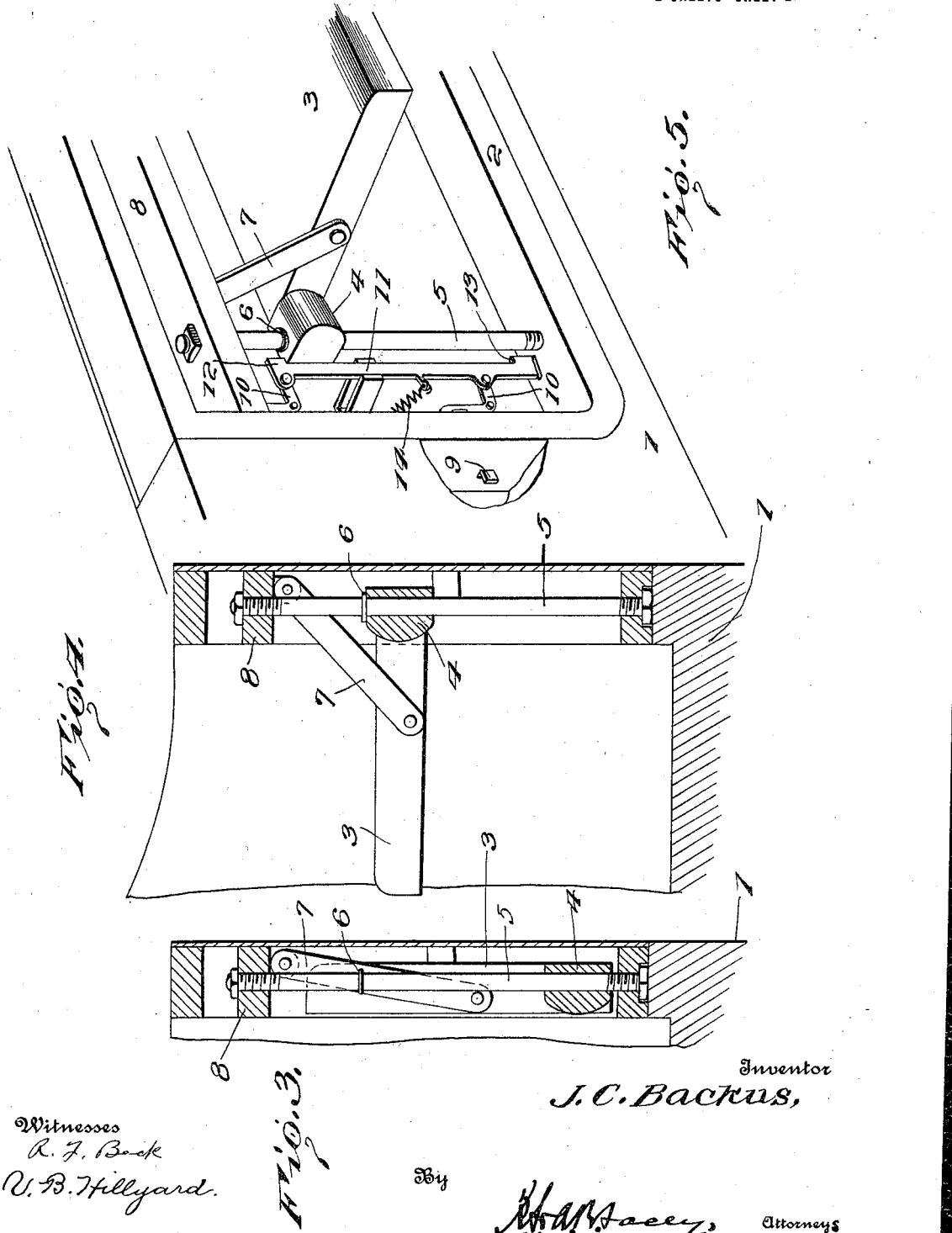

UNITED STATES PATENT OFFICE.

JOHN CLAYTON BACKUS, OF SMETHPORT, PENNSYLVANIA.

AUXILIARY SEAT FOR MOTOR-CARS.

1,179,600.  Specification of Letters Patent.  Patented Apr. 18, 1916.

Application filed March 19, 1915. Serial No. 15,560.

*To all whom it may concern:*

Be it known that I, JOHN CLAYTON BACKUS, a citizen of the United States, residing at Smethport, in the county of McKean and State of Pennsylvania, have invented certain new and useful Improvements in Auxiliary Seats for Motor-Cars, of which the following is a specification.

The primary object of this invention is to increase the seating capacity of motor vehicles particularly of the type designed for pleasure, whereby passengers in excess of those for which the seating capacity of the car is provided may be carried in comfort and with safety.

In accordance with this invention the door, by means of which access to and egress from the car is had, is utilized as supporting means for an auxiliary seat, the latter being constructed to fold within the door so as to be out of the way when not required for use and such seat serving when lowered into operative position, to project a lock bolt to secure the door against accidental opening, thereby relieving the occupant of the auxiliary seat from the danger which would attend the mounting of a seat upon the door in the absence of special locking means positively controlled by the seat.

Motor vehicle doors generally comprise a framework and a covering plate attached to the outer side of the framework, thereby leaving a space upon the inner side of the door within the framework. The present invention utilizes this space for receiving the auxiliary seat which is adapted to fold therein so as not to occupy valuable space.

With these and other objects in view, which will readily appear as the nature of the invention is better understood, the same consists in the improved construction and novel arrangement and combination of parts which will be hereinafter fully described and particularly claimed.

In the accompanying drawings has been illustrated a simple and preferred form of the invention, it being, however, understood that no limitation is necessarily made to the precise structural details therein exhibited, but that changes, alterations and modifications within the scope of the invention as claimed may be resorted to when desired.

Referring to the drawings, Figure 1 is a view in elevation of a side portion of a motor vehicle showing the door provided with a folding seat embodying the invention, the seat being folded and the lock mechanism in retracted position. Fig. 2 is a view of the parts illustrated in Fig. 1 showing the seat lowered and the lock mechanism projected and securing the door against casual opening. Fig. 3 is a section on the line 3—3 of Fig. 1. Fig. 4 is a section on the line 4—4 of Fig. 2. Fig. 5 is a perspective view of a portion of the door and seat showing more clearly the locking mechanism.

Corresponding and like parts are referred to in the following description and indicated in all the views of the drawings by the same reference characters.

The numeral 1 designates a portion of a side of the body or car of a motor vehicle and 2 the door closing the opening formed in such side to admit of ingress to and egress from the vehicle. The door 2 may be of any ordinary construction and is hinged at one side to the body of the vehicle and free to swing outward at the opposite side, such door being provided with the usual lock, not shown, for securing the door when closed. Such doors as usually constructed are formed with a space upon the inner side, such space being inclosed by the frame of the door.

The auxiliary seat is indicated at 3 and is mounted to fold into the space formed upon the inner side of the door as well as to swing downward into horizontal position when required for use. The rear end of the seat is pivoted to a slide 4. Suitable guides 5 are provided for the slides 4 to move upon, the guides 5 being vertically disposed and secured at their upper and lower ends to cross pieces of the door frame. The guides 5 may consist of rods or bars. Stops 6 are formed or otherwise provided upon the upper portions of the guides 5 and limit the upward movement of the slides 4, thereby supporting the seat 3 in horizontal position as indicated most clearly in Figs. 4 and 5. Braces 7 are pivotally connected at their lower ends to the seat 3 and at their upper ends to a cross piece 8 of the door frame. The braces 7 support the seat 3 in horizontal position.

The locking mechanism which is of substantial construction may comprise any number of locking elements and is conveniently disposed to be positively actuated by means of the seat so as to be projected into locking engagement when the seat is lowered and into retracted position when the seat is folded. The seat operated lock mechanism is independent of the ordinary door lock and serves to secure the door against possible opening when the seat is lowered, thereby insuring safety to the occupant of the auxiliary seat. As indicated in the drawings the locking mechanism comprises like upper and lower locking elements 9, thereby securing the door at two points near the top and bottom. The locking elements consist of slide bolts and are disposed to move outward into engagement with the portions of the car bordering upon the door opening. Bell cranks 10 pivoted to the door have their arms connected to the locking elements and to a tie 11 so as to cause a simultaneous movement of the locking elements.

Fig. 2 shows the locking elements projected and Fig. 1 indicates the locking elements retrieved or in released position. The outer ends of the locking elements 9 are adapted to operate through openings formed in the outer vertical edges of the door and are adapted to enter openings formed in the vertical edges of the vehicle body bordering upon the door opening. The two locking elements 9 upon the same side of the door are connected for simultaneous movement and are coupled by means of the tie 11 which consists of a bar or rod. A stop 12 is disposed near the upper end of the connection 11 and a similar stop 13 is located near the lower end of the connection 11. The stops 12 and 13 are arranged in the path of the adjacent slide 4 so as to be engaged thereby. When the seat 3 is lowered into horizontal position the slides 4 are elevated and the slide adjacent the connection 11 makes contact with the stop 12 and moves the connection 11 upward, thereby actuating the locking elements 9 and projecting them into locked position, as indicated in Fig. 2. When the seat 3 is folded the slides 4 move downward and the slide adjacent the connection 11 engages the stop 13 and moves such connection downward and operates the locking elements 9 and throws them into retracted position, as indicated in Fig. 1. A retractile helical spring 14 connects the tie 11 with the door and normally tends to hold the tie 11 in elevated position with the locking elements 9 in projected or locked position. This is of advantage since it precludes any possible releasing of the locking elements 9 by a sliding movement of the seat 3, such as occasioned by the vehicle passing over an obstruction or dropping into a depression.

It will be understood from the foregoing, taken in connection with the accompanying drawings, that the invention provides for utilization of the space in a vehicle so as to conveniently and comfortably carry passengers in excess of the seating capacity generally provided. It is further noted that while the door is utilized as a support for the auxiliary seat, such door is made secure against casual opening when the auxiliary seat is lowered or occupied. The arrangement is such that movement of the seat into serviceable position positively actuates the lock to secure the door against casual opening and such door is not released until the seat is fully returned to folded or normal position. By having the lock mechanism comprise a number of locking elements and disposing the same at different elevations the door is made secure near the top and bottom with the result that such combined action of such binding elements insures safety to the occupant of the auxiliary seat against possible opening of the door under ordinary conditions.

As shown it is preferred to duplicate the lock mechanism and adjunctive parts at opposite edges of the door so as to secure the same and prevent any outward displacement of the door due to the weight imposed thereon and any shock resulting from the vehicle passing over uneven surfaces, or from other cause.

Having thus described the invention what is claimed as new is:—

1. In combination, a movable member, a lock for securing such member against movement, a movable seat mounted upon said member, and coacting elements connected respectively with the said lock and with the seat and operated by movement of the seat to project the lock to secure the member against movement or to retract the lock to permit the ordinary movement of the member.

2. In combination, a door, a lock therefor, a movable seat mounted upon the door, coacting elements connected with the lock and seat to positively actuate the lock and hold the same in locked position to secure the door when the seat is in operative position and to release the door when the seat is folded.

3. In combination, a door, a lock therefor, means for holding the lock in projected position, a folding seat mounted upon the door, and coacting elements connected with the lock and seat to move the lock into retracted position when the seat is folded.

4. In combination, a door, a lock therefor, a movable seat mounted upon the door, and upper and lower stops having connection with the lock and adapted to be actuated by the seat to throw the lock into projected position when the seat is lowered and to retract the lock when the seat is folded.

5. In combination, a door, a folding seat mounted upon the door, a lock for securing the door, and a member connected with the lock and having upper and lower stops to be operated by the seat for throwing the lock into projected position when the seat is lowered and into retracted position when the seat is folded.

6. In combination, a door, a folding seat mounted thereon, upper and lower locking elements, and a tie connecting the locking elements and adapted to be positively moved by the seat to throw the locking elements into projected position when the seat is lowered and into retracted position when the seat is folded.

7. In combination, a door, a locking element pivoted intermediate of its ends to the door and having its outer end offset and a folding seat mounted upon the door and adapted to positively move the inner end of the locking element to project or retract the outer end thereof.

8. In combination, a door, upper and lower locking elements mounted upon the door, a connection between the locking elements to cause them to move in unison, upper and lower stops upon such connection, and a folding seat mounted upon the door and adapted to engage the said stops and positively move the connection to project the locking elements when the seat is lowered and to retract the locking elements when the seat is folded.

9. In combination, a door, a lock mounted thereon, a slide mounted upon the door, and a folding seat connected to the slide and movable therewith, such slide serving as a trip for positively actuating the lock to project the same when the seat is lowered and to move the lock into retracted position when the seat is folded.

10. In combination, a door, a lock therefor, a guide, a slide mounted upon the guide and adapted to operate the lock, a folding seat having pivotal connection with the slide and a stop to limit the movement of the seat and slide when such seat is moved into serviceable position.

11. In combination, a door, a lock therefor, a guide, a slide mounted upon the guide and adapted to actuate the lock, a seat pivoted to the slide and a brace pivotally connecting the seat with the door.

In testimony whereof I affix my signature in presence of two witnesses.

JOHN CLAYTON BACKUS. [L. s.]

Witnesses:
HALLIE A. WALKER,
F. D. GALLUP.

Copies of this patent may be obtained for five cents each, by addressing the "Commissioner of Patents. Washington, D. C."